United States Patent [19]
Araki et al.

[11] 3,971,711
[45] July 27, 1976

[54] PROCESS FOR INCREASING RADIATION-CURABILITY OF A RADIATION-CURABLE RESIN

[75] Inventors: Kunio Araki; Takashi Sasaki; Kazuo Goto, all of Takasaki, Japan

[73] Assignees: Nitto Boseki Co.; Japan Atomic Energy Research Institute, Tokyo, both of Japan

[22] Filed: July 31, 1973

[21] Appl. No.: 384,366

[30] Foreign Application Priority Data
Aug. 4, 1972  Japan.............................. 47-77709
Aug. 4, 1972  Japan.............................. 47-77710

[52] U.S. Cl.................... 204/159.19; 204/159.14; 204/159.15; 204/159.20
[51] Int. Cl.²................... C08F 8/00; C08F 2/54; C08G 63/02

[58] Field of Search................ 204/159.14, 159.15, 204/159.19, 159.20; 260/40 R

[56] References Cited
UNITED STATES PATENTS

| | | | |
|---|---|---|---|
| 3,098,808 | 3/1958 | Anderson....................... | 204/159.20 |
| 3,721,643 | 3/1973 | Vargiu et al. .................... | 260/40 R |
| 3,737,481 | 6/1973 | Vargiu et al. .................. | 204/159.19 |
| 3,773,638 | 11/1973 | Gotoh et al.................... | 204/159.20 |

*Primary Examiner*—Murray Tillman
*Assistant Examiner*—Thurman K. Page
*Attorney, Agent, or Firm*—Browdy and Neimark

[57] ABSTRACT

Radiation-curing reaction of a radiation-curable resin such as an unsaturated polyester resin is promoted by using a combination of an ionizing radiation and a substantial amount of an adding material.

5 Claims, 2 Drawing Figures

PROCESS FOR INCREASING RADIATION-CURABILITY OF A RADIATION-CURABLE RESIN

This invention relates to an improved process for curing radiation-curable resin compositions such as unsaturated polyester resin compositions by means of radiation. More particularly, this invention relates to a process for increasing radiation-curability of a radiation-curable resin such as an unsaturated polyester resin and, at the same time, providing a cured product of said resin with improved physical and chemical properties, by making use of the synergistic effect of using a combination of an ionizing radiation and an additive such as inorganic compound, organic compound or a basic salt of a certain metal.

The industry of unsaturated polyester resins has developed remarkably, and today such resins are used in paints, decorative sheets, adhesives, binders for a composite material and the like.

The conventional process for curing said type of unsaturated polyester resin uses a radical initiator such as a peroxide or a specific azo compound together with an amino compound, a metallic salt, a benzoin compound and the like at an elevated temperature. Other processes similar to the process mentioned above include a step of allowing to stand at room temperature, or subjecting the resin to ultraviolet light or ultrasonic wave, instead of heating, for curing the resin, and, from these various processes, the most appropriate one has been selected and employed as the case may be.

It has been known, as regards a process for making a composite material comprising a resin, that additives such as silica, clay, calcium carbonate, magnesium oxide, polystyrene and the like can be incorporated advantageously in said resin comprising an unsaturated polyester for the purpose of modifying fluidity of an uncured resin or improving the hardness and/or surface-smoothness of said resin.

Though the addition of an adding material comprising such inorganic or organic compounds as mentioned above to an unsaturated polyester resin is generally advantageous for improving physical properties and/or the appearance of a cured resin or for lowering the cost of a product, it usually impairs the curability of a resin; that is, as a result of said addition, the curing reaction is often retarded, or the curing is often not completed. Accordingly, completely cured satisfactory products could not be obtained by said prior art process without employing a much larger amount of the curing catalyst and promoter in the resin to be cured for the purpose of promoting and completing the curing reaction as compared with the case in which the resin containing no substantial amounts of said adding materials are to be cured. This increases the cost and, more, unsaturated polyester resins containing such a large amount of a curing catalyst together with a substantial amount of inorganic or organic compounds as additives are apt to undergo premature curing during storage as a result of natural degradation of the catalyst. In order to prevent this from happening, it has been necessary to employ expensive stabilizers or to use special and expensive catalysts.

A technique for curing a radical-polymerization type of a thermosetting resin such as an unsaturated polyester resin by means of an ionizing radiation has been introduced to the field of manufacturing paints, decorative sheets, adhesives and the like, and some of the reports have shown the possibility of applying this technique to the production of a composite material such as an FRP (Fiber Reinforced Plastic).

That is, it has been known that unsaturated polyester resins can be cured by being irradiated with an ionizing radiation such as $\alpha$-ray, $\beta$-ray, $\gamma$-ray, X-ray, electron beams and the like.

The present inventors have discovered that the curability of an unsaturated polyester resin under the influence of an ionizing radiation is appreciably increased as a result of the addition of up to about 300 parts by weight per 100 parts by weight of resin of one or more of compounds comprising a metal having an atomic number of 11 or more. Such compounds include, for example, fine powders of average particle size of less than 70 $\mu$ (200 mesh), preferably less than 10 $\mu$ of an inorganic compound such as gypsum, cement, quartz and the like. This finding is completely unexpected in the light of the conventional technique in which thermal curing means is employed, wherein curability is decreased or prevented when a relatively large amount of filler is used.

In accordance with a conventional thermal curing process, the curability of the resin usually decreases as the amount of additive added increases. FIG. 2 clearly illustrates this fact.

It has also been found by the present inventors that if a basic salt of a metal selected from the metals belonging to the Groups I and II of the Periodic Table is incorporated in said resin material, containing or not containing said additive, the curability of said resin under the influence of an ionizing radiation is further increased.

When these organic or inorganic compounds are used as additives in a catalytic curing process, it is considered that they exist there as inactive materials which are completely inert to the resin or that they may often have an injurious effect — that is, they may take away from radicals the energy which is indispensable to the progress of a curing reaction or will obstruct the contact of radicals with monomers.

However, when an ionizing radiation is used for curing a resin incorporating such additive, said additive is believed to act as a material which promotes, at least slightly, the curing reaction. It is believed that the additive momentarily becomes an active species which promotes the curing reaction due to elastic or non-elastic scattering of the energy of radiation.

It has been observed that though the basic salt of a metal is usually reactive to an active carboxyl group in a resin, it is insensitive to the reactivity of a radical when it is placed in the process of catalytic curing. In fact, it even tends to obstruct the progress of the curing reaction.

However, when an ionizing radiation is employed for curing purpose, said basic salt shows a possibility of emitting a secondary electron beam as well as the possibility of scattering the primary radiation and its becoming an active species with a very short life, as is in the case when an additive of an inactive compound for thermal curing is employed. Further, it has been observed that if said basic salt is used together with said inorganic or organic additives, the effect of the promotion is increased further. As is evident from the above description, the basic salt functions as a promoter for curing reaction very effectively.

It is easily understood from the above description that a powdered additive comprising organic or inorganic compound or said basic salt of a metal can be advantageously incorporated singly in said unsaturated polyester resin as a promoter for curing reaction, and that the use of two or more of said materials in combination is even more effective for the same purpose.

Otherwise, organic polymer materials emit insufficient secondary radiation to promote curing of said resin in comparison with the inorganic additives, because they have not atoms less than 11 of atomic number.

The process of this invention can be employed advantageously in the curing of various materials such as paint, decorative sheet, adhesives and the like by means of an ionizing radiation. But, the most important advantage resulting from the use of an ionizing radiation is believed to lie in its application to such purposes as the modification of fluidity of an uncured resin such as a composite material, the production of a cured material with improved hardness and surface-flatness, or the production of a cured material with superior properties using a raw material resin containing a very large amount of an additive for the purpose of cost reduction.

Useful unsaturated polyester resins which can be advantageously employed in the practice of this invention include a reaction product of an unsaturated acid selected from maleic acid, HET acid (Hexachloro-endomethylene-tetrahydro phthalic anhydride), Himic anhydride (3,6-endomethylene $\Delta^4$-tetrahydro-cis-phthalic anhydride), fumaric acid, itaconic acid, citraconic anhydride, trimellitic acid and the like with a member selected from a dihydric and a polyhydric alcohol; a solution of a modified unsaturated polyester dissolved in one or more of polymerizable polymers selected from styrene, vinyl acetate, vinyltoluene, chlorostyrene, divinylbenzene, acrylic or methacrylic ester, acrylonitrile, methacrylonitrile, diallyl phthalate, triallyl cyanurate, trimethylolpropane trimethacrylate, ethylene glycol dimethacrylate and the like, and a solution obtained by adding a solvent to said solution, wherein said modified unsaturated polyester having been obtained by partially modifying said reaction product with a member selected from an aliphatic carboxylic acid, an aromatic carboxylic acid and an alicyclic carboxylic acid or with a member selected from halogen derivatives of said carboxylic acids. Various pigments, dyes or curing catalyst can be incorporated in any of said solutions if necessary.

Any type of a resin can be advantageously employed in the practice of this invention so long as it can be cured by being irradiated with an ionizing radiation. Useful resins include a modified epoxy resin, a modified urethane resin, a modified silicon resin, 1-2 polybutadiene resin and the like.

Useful inorganic additives which can be advantageously incorporated as additives in a resin in the practice of this invention include the powders of gypsum, cement, quartz as well as calcium carbonate, clay, talc, asbestos, red mud of bauxite and the like.

The amount of adding material to be used in a resin in the practice of the present invention should be more than 50 parts by weight of said adding material per 100 parts by weight of said resin, but less than the amount which will cancel the moldability (or fluidity) of the resin, which amount corresponds to about 300 parts by weight per 100 parts of a resin, but 60 parts by weight or more of an additive per 100 parts by weight of a resin is preferred. The curability of a resin improves as the amount of an additive added is increased. But, of course, the amount of an additive should be less than the upper limit mentioned previously.

Basic salts of metals which can be advantageously employed in the practice of the present invention include the basic salts of the metals of Group I and Group II of the Periodic Table, such as oxides, hydroxides, carbonates, phosphates, organic acids-salts of said metals, including, for example, magnesium oxide, calcium hydroxide, zinc carbonate, potassium hydrogen (ortho) phosphate, potassium tartrate and the like.

The amount of said basic salts of metals is more than about 0.1 part by weight per 100 parts by weight of the unsaturated polyester resin and less than the critical amount which will cancel the moldability (or fluidity) of the resin, which corresponds to about 300 parts by weight per 100 parts by weight of a resin; the preferred proportional range to be employed in the practice of the present invention is about 0.5 – 50 parts by weight of said basic salt per 100 parts by weight of the resin. Any one of said inorganic adding materials and said basic salts of a metal can be incorporated singly in said resin mixture, but a combination of any two or more of them may be incorporated in said resin mixture more advantageously.

Reinforcing fiber material may also be added thereto advantageously.

Ionizing radiations of 0.5 – 7.0 MeV and $10^{-2} - 2 \times 10^7$ rad/sec of dose rate can be advantageously employed as radiation source in the practice of the present invention.

Useful radiations include $\alpha$-ray, $\beta$-ray, $\gamma$-ray, X-ray, accelerated electron beam and the like. Other radiations such as proton-ray, electron-ray and the like may also be advantageously used. For the curing of resin, any starting temperature is available between −20°C and above 60°C.

In order that those skilled in the art may more readily understand the present invention, the following specific examples are given.

EXAMPLE 1

A mixture of 0.5 M of phthalic anhydride, 0.5 M of maleic anhydride and 1.1 M of propylene glycol was placed in a reactor. While introducing nitrogen gas therein, the mixture was heated to 190°C to have one ingredient reacted with another, until the acid value of the mixture reached 50. To the product thus obtained was added 0.01 phr (parts by weight per hundred parts by weight of resin) of hydroquinone at a temperature not higher than 70°C and, then, said product is poured in styrene kept at 25°C to be dissolved therein in order to obtain a product containing 70% by weight of solid content.

Figure 1:
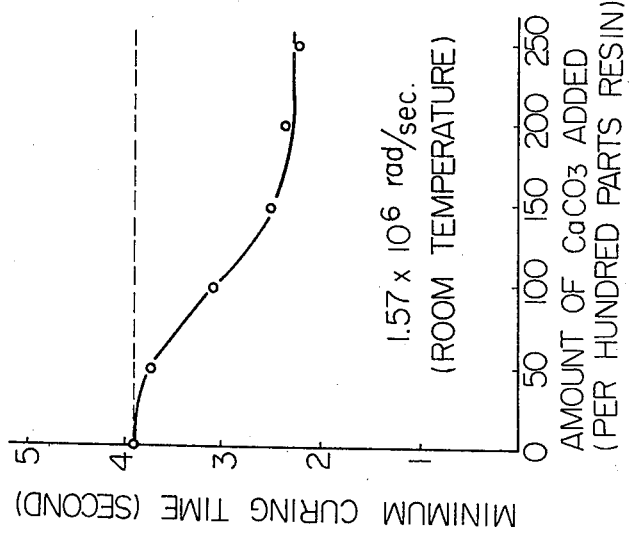
FIG. 1 shows the change in minimum curing time with the adding of $CaCO_3$ when curing is carried out by the radiation-curing process.

Fine particles of calcium carbonate are added to the unsaturated polyester resin prepared by the above procedure in amounts of 50, 100, 150, 200 and 250 parts by weight per 100 parts by weight of said resin. Each resin composition obtained was poured into an aluminum-dish 5 cm in diameter until it was 2 mm deep, then irradiated with an accelerated electron beam at the dose rate of $1.75 \times 10^6$ rad/sec at 2.0 MeV to cure the same. FIG. 1 shows the result of this irradiation. From the FIG. 1, it can be understood that curing of the unsaturated resin is promoted by the addition of fine particles of calcium carbonate.

For comparison, to each unsaturated polyester resin composition above is added 1 part by weight of benzoyl peroxide per 100 parts by weight of said resin and then each mixture is cured by heating in a water bath having a temperature of 80°C according to the method of JIS-K6901 4.6. The minimum curing time with respect to the resin compositions thus obtained is shown in FIG. 2.

Figure 2:
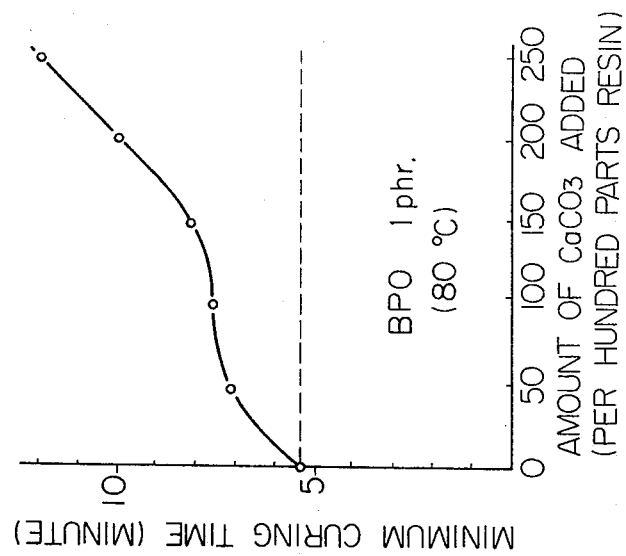
FIG. 2 shows the same relation as mentioned with respect to FIG. 1 but when curing is carried out by the conventional thermal curing process.

It is apparent from FIGS. 1 and 2 that the time required for curing the unsaturated polyester resin is remarkably reduced as the amount of $CaCO_3$ increases.

EXAMPLE 2

To the unsaturated polyester resin prepared according to the procedure of Example 1, 100 parts by weight of fine particles of calcium carbonate and 1.0 or 2.0 parts by weight of magnesium oxide powder per 100 parts by weight of said resin were added. Then, for the purpose of curing, each composition was irradiated with an accelerated electron beam at the dose rate of $1.57 \times 10^6$ rad/sec at 2.0 MeV. Remarkable promotion in curing said resin is confirmed by the data listed in Table 1.

Table 1

| | A | B | C | D | E |
|---|---|---|---|---|---|
| unsaturated polyester resin (g) | 100 | 100 | 100 | 100 | 100 |
| $CaCO_3$ (g) | 0 | 100 | 100 | 100 | 0 |
| MgO (g) | 0 | 0 | 1 | 2 | 2 |
| radiation dose required for curing (M rad) | 6.0 | 5.0 | 3.5 | 3.0 | 4.0 |
| curing time required for curing (sec) | 3.82 | 3.18 | 2.23 | 1.91 | 2.55 |
| acetone-extraction residue (%) | 98.0 | 97.9 | 98.5 | 98.8 | 98.5 |
| Barcol hardness | 40 | 46 | 46 | 45 | 40 |

EXAMPLE 3

To the unsaturated polyester resin prepared according to the procedure of Example 1, potassium carbonate is added to make a dispersion in an amount of 10 parts by weight per 100 parts by weight of said resin. A glass fiber mat was impregnated with the dispersion (resin composition) and, then, the resulting mixture was irradiated with an electron beam at the dose rate of $6.6 + 10^5$ rad/sec at 2 MeV to cure the resin. The resin in the dispersion was cured with the irradiation of 5.0 M rad in total dose (corresponding to the irradiation for 9.10 sec). The amount of acetone-extraction residue of the above cured product was not less than 98% by weight.

For comparison, unsaturated polyester resin was subjected to the same procedure except for adding potassium carbonate therein. In this case, a radiation dose as much as 6 M rad (corresponding to the irradiation for 9.10 sec) was required for curing. The acetone-extraction residue of the cured product amounted to 98% by weight.

Table 2 shows the comparison of the physical properties between a laminate made of the product cured according to the present method and a laminate made of the otherwise cured product.

As is clear from this Table, the former is found to be superior in the properties desired.

Incidentally, the electron beam radiation dose required for curing the resin was 6 M rad in total dose (corresponding to irradiation for 9.10 sec) when the resin which was not blended with $K_2CO_3$ was impregnated in the glass fiber mat. This fact suggests that the presence of a glass fiber mat has no influence on the method of curing by irradiation.

Table 2

| | cured laminate of $K_2CO_3$-free resin | cured laminate of $K_2CO_3$-containing resin |
|---|---|---|
| thickness of FRP (mm) | 2.8 | 2.8 |
| glass content (%) | 40.0 | 39.3 |
| bending strength | | |
| : dry (Kg/mm²) | 27.5 | 27.5 |
| : wet (Kg/mm²) | 27.3 | 26.7 |
| : retention (%) | 99.3 | 97.1 |
| Young's modulus in bending(Kg/mm²) | 970 | 1040 |
| water absorption (%) | 0.78 | 0.83 |

EXAMPLE 4

To the unsaturated polyester resin prepared according to the procedure of Example 1, powdered $Ca(OH)_2$ was added in the amounts of 0.5 and 10.0 parts by weight per 100 parts by weight of said resin, respectively. After the mixtures had been sufficiently stirred to disperse the powders in the resin, each of the dispersions was irradiated with an accelerated electron beam at the dose rate of $6.6 \times 10^5$ rad/sec. The resin containing 0.5 phr of $Ca(OH)_2$ was cured with the irradiation of 5.0 M rad in total dose (corresponding to irradiation for 7.58 sec), while the other one containing 10.0 phr of $Ca(OH)_2$ required only 3.0 M rad of radiation dose (corresponding to irradiation for 4.55 sec) for curing. The amount of acetone-extraction residue is more than about 98% by weight in each case.

EXAMPLE 5

To the unsaturated polyester resin prepared according to the procedure of Example 1, soda lime was added with sufficient stirring to be dispersed therein in the amount of 10 parts by weight per 100 parts by weight of the resin. The dispersion thus obtained was irradiated with $^{60}Co$-γ ray at the dose rate of $2.8 \times 10^2$ rad/sec in order to cure the resin. The resin was cured with the irradiation of 0.75 M rad in total dose (corresponding to the irradiation for 1.5 hours). The amount of acetone-extraction residue of the cured product is not less than 98% by weight.

When the unsaturated polyester resin was subjected to irradiation under the same conditions as above without adding thereto the basic salt above, it was cured with the irradiation of 1.5 M rad in total dose (corresponding to the irradiation of 3.0 hours). The acetone-extraction residue of the cured product amounted to not less than 90% by weight.

EXAMPLE 6

To the unsaturated polyester resin prepared according to the procedure of Example 1, powdered dipotassium phosphate was added with sufficient stirring in the amount of 10 parts by weight per 100 parts by weight of the resin and is dispersed in the resin. The dispersion thus obtained was irradiated with an accelerated electron beam at the dose rate of 6.6 × 10⁵ rad/sec at 2 MeV. The resin was cured with the radiation dose of 5.0 M rad (corresponding to the irradiation for 7.58 sec). The amount of acetone-extraction residue of the cured product was 98% by weight.

EXAMPLE 7

To the unsaturated polyester resin prepared according to the procedure of Example 1, powdered sodium acetate was added in the amount of 0.5 parts by weight per 100 parts by weight and was mixed with the resin. The mixture was irradiated with an electron beam at the dose rate of 6.6 × 10⁵ rad/sec at 1 MeV. The resin was cured when the total radiation dose amounted to 5.5 M rad (corresponding to the irradiation for 8.44 sec). The amount of acetone-extraction residue of the cured product was 98% by weight.

We claim:

1. A process for curing an unsaturated polyester resin comprising the steps of:

incorporating in said unsaturated polyester resin from about 50 to about 300 parts by weight, per 100 parts by weight of the resin, of one or more compounds of a finely powdered material of an inactive inorganic compound selected from the group consisting of calcium carbonate, clay, quartz powder, gypsum, cement, mica powder, glass powder, diatomaceous earth, talc, asbestos and red mud of bauxite; and irradiating the resin containing the compounds with an ionizing radiation applied thereto at a dose rate of $10^{-2} - 2 \times 10^7$ rad/sec for a total dose of 0.1-10 Mrad, and at a starting temperature of from about −20°C to about 60°C, whereby secondary radiation being emitted from the compounds and/or the compounds activating themselves promote the radiation-curing reaction.

2. A process in accordance with claim 1, in which said incorporating step further includes incorporating a basic salt of a metal belonging to Group I or II of the Periodic Table in an amount of 0.1 - 50 parts by weight per 100 parts by weight of said resin.

3. A process in accordance with claim 1 in which said ionizing radiation is a member selected from the group consisting of α-ray, β-ray, γ-ray, X-ray, electron beam and the mixtures thereof.

4. A process in accordance with claim 1 in which said inorganic compound is calcium carbonate and said ionizing radiation is an accelerated electron beam or γ-ray.

5. A process in accordance with claim 2 in which said compound is a combination of calcium carbonate and magnesium oxide and said ionizing radiation is an electron beam.

* * * * *